(12) United States Patent
Wang et al.

(10) Patent No.: US 11,371,169 B2
(45) Date of Patent: Jun. 28, 2022

(54) RUBBER FOR TEXTILE ROLLER AND PREPARATION METHOD THEREFOR

(71) Applicant: The Hong Kong Research Institute of Textiles and Apparel Limited, Hong Kong (CN)

(72) Inventors: Jingping Wang, Hong Kong (CN); Xue Luo, Hong Kong (CN); Chenxiao Yang, Hong Kong (CN); Li Li, Hong Kong (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 493 days.

(21) Appl. No.: 16/079,634

(22) PCT Filed: Feb. 29, 2016

(86) PCT No.: PCT/CN2016/074833
§ 371 (c)(1),
(2) Date: Dec. 21, 2018

(87) PCT Pub. No.: WO2017/143619
PCT Pub. Date: Aug. 31, 2017

(65) Prior Publication Data
US 2019/0136420 A1 May 9, 2019

(30) Foreign Application Priority Data
Feb. 24, 2016 (CN) .......................... 201610101160.4

(51) Int. Cl.
| | |
|---|---|
| *D01H 5/74* | (2006.01) |
| *C08L 9/02* | (2006.01) |
| *C08K 3/04* | (2006.01) |
| *C08K 5/18* | (2006.01) |
| *C08K 3/22* | (2006.01) |
| *C08K 13/02* | (2006.01) |
| *C08J 3/20* | (2006.01) |
| *C09D 5/24* | (2006.01) |
| *C09D 109/02* | (2006.01) |
| *C09D 7/63* | (2018.01) |
| *C09D 7/65* | (2018.01) |
| *C09D 7/61* | (2018.01) |
| *B29C 35/02* | (2006.01) |
| *C08K 13/04* | (2006.01) |
| *C08K 7/06* | (2006.01) |
| *C08K 7/24* | (2006.01) |
| *B29B 7/00* | (2006.01) |
| *C08K 3/08* | (2006.01) |
| *B29K 9/00* | (2006.01) |

(52) U.S. Cl.
CPC .............. *D01H 5/74* (2013.01); *B29B 7/00* (2013.01); *B29C 35/02* (2013.01); *C08J 3/201* (2013.01); *C08K 3/04* (2013.01); *C08K 3/041* (2017.05); *C08K 3/08* (2013.01); *C08K 3/22* (2013.01); *C08K 5/18* (2013.01); *C08K 7/06* (2013.01); *C08K 7/24* (2013.01); *C08K 13/02* (2013.01); *C08K 13/04* (2013.01); *C08L 9/02* (2013.01); *C09D 5/24* (2013.01); *C09D 7/61* (2018.01); *C09D 7/63* (2018.01); *C09D 7/65* (2018.01); *C09D 109/02* (2013.01); *B29B 7/005* (2013.01); *B29K 2009/00* (2013.01); *C08K 2003/2296* (2013.01); *C08K 2201/001* (2013.01); *C08K 2201/011* (2013.01); *C08L 2205/06* (2013.01)

(58) Field of Classification Search
None
See application file for complete search history.

(56) References Cited

U.S. PATENT DOCUMENTS

| | | | | |
|---|---|---|---|---|
| 4,504,604 | A * | 3/1985 | Pilkington | .............. C08L 65/00 42/74 |
| 6,182,333 | B1 | 2/2001 | Lauhus | |
| 2007/0197702 | A1 * | 8/2007 | Nasreddine | .............. C08K 5/02 524/261 |
| 2018/0370197 | A1 * | 12/2018 | Nagamune | ............... C09D 5/32 |

FOREIGN PATENT DOCUMENTS

| | | | |
|---|---|---|---|
| CN | 102344598 A | | 2/2012 |
| CN | 102702591 | * | 10/2012 |
| CN | 103408899 | * | 11/2013 |

(Continued)

OTHER PUBLICATIONS

Song, Guojun et al., "Studies on Electric Conductivity of Carbon Fiber/Rubber Composites", Journal of Shandong College of Textile Technology, col. 10, No. 01, Mar. 31, 1995, (Mar. 31, 1995), sections 1, 2, and 3.1, table 1, and figures 1-2.
International Search Report and Written Opinion of PCT application No. PCT/CN2016/074833 issued from the International Search Authority dated Nov. 30, 2016.
Extended European Search Report of EP16891073.5 issued by the European Patent Office (EPO) dated Jan. 2, 2020.

(Continued)

*Primary Examiner* — Tanisha Diggs
(74) *Attorney, Agent, or Firm* — Spruson & Ferguson (Hong Kong) Limited

(57) ABSTRACT

Provided is a rubber for a textile roller and a preparation method therefor. The main material of the rubber for a textile roller is a nitrile butadiene rubber, added with conductive powder and conductive bands to form a net-node structure in the nitrile butadiene rubber by means of a mixing process, so that the rubber for a textile roller has a high electric conductivity, can timely export static electricity, and has good mechanical performance suitable for a textile roller, applicable in components of a spinning frame, a roving frame, a drawing frame and other textile machines.

5 Claims, 1 Drawing Sheet

(56) References Cited

FOREIGN PATENT DOCUMENTS

| CN | 104371153 A | 2/2015 |
|----|-------------|--------|
| CN | 104693524 A | 6/2015 |
| EP | 0760404 A1  | 3/1997 |
| EP | 1439203 A1  | 1/2004 |
| JP | S6243463 A  | 2/1987 |

OTHER PUBLICATIONS

Database WPI, Week 201351, Thomson Scientific, London, GB; AN 2013-A79666 & CN 102 702 591 A (Univ. Qingdao Sci & Technology) Oct. 3, 20212 (Oct. 3, 2012).

Examination Report of EP 16891073.5 issued by the European Patent Office (EPO) dated Nov. 9, 2020.

Zhang; The Preparation of Carbon-Based Materials/Rubber Composites and Research of Their Structure and Properties; Master's Dissertation; Sep. 7, 2015; pp. 1-73, XP009511598.

\* cited by examiner

RUBBER FOR TEXTILE ROLLER AND PREPARATION METHOD THEREFOR

FIELD OF THE INVENTION

The present disclosure generally relates to a material for a textile roller, and particularly relates to a rubber of high electric conductivity and high mechanical performance, with nitrile butadiene rubber as the main material and added with conductive powder and conductive bands, used as a rubber for a textile roller, and relates to the preparation method of the rubber for a textile roller.

BACKGROUND OF THE INVENTION

A textile roller or a drafting roller (or textile top roller) refers to a cylindrical rotatory component with functions such as feeding, drafting yarn, and exporting yarn. A drafting roller is the main component of the drafting mechanism of a spinning machine, with an upper roller and a lower roller as a pair forming a roller jaw, which holds a sliver for drafting. The quality of a roller directly affects the uniformity of the sliver output therefrom. In the existing spinning processes, the surface of the rollers used in spinning machines are wrapped with elastic materials, in order to uniformly hold a fiber while not damaging the fiber.

Nitrile butadiene rubber (NBR) is a synthetic rubber, and is a copolymer that is polymerized by acrylonitrile monomer and butadiene monomer; NBR has advantages such as excellent oil resistance (especially to alkane oil), high wear resistance, good airtightness, strong adhesion, and good aging resistance. NBR is a regular wrap of a textile roller. During the process of using some special fibers, due to big differences in the work function of an electron for the materials of the special fibers and NBR, the roller and the fiber would easily have friction that produces static electricity. When the static electricity cannot be timely exported, the fiber-winding-around-roller phenomenon would occur.

Technical Problem

The technical problems to be solved by the present disclosure are, to provide a rubber for a textile roller and the preparation method thereof, which solves the problems of the existing rubbers for a textile roller, i.e. rubbers and fibers have friction that produces static electricity, and the static electricity cannot be timely exported.

Technical Solutions

The technical solutions of the present disclosure that solve the aforementioned technical problems are: to provide a rubber for a textile roller, with NBR as the main materials, and added with conductive powder and conductive bands; via a pre-mixing process flow, the conductive powder and the conductive bands form a net-node structure in the NBR.

In the rubber for a textile roller provided by the present disclosure, the net-node structure comprises a conductive net and conductive nodes. The conductive bands form the conductive net, and the conductive powder form the conductive nodes.

In the rubber for a textile roller provided by the present disclosure, the rubber comprises compositions with following mass ratios: NBR 100, conductive powder 10-40 conductive bands 0.5-8, plasticizer 6-15, anti-aging agent 1-2, vulcanizing agent 2.5-4.5, and zinc oxide 3-5.

In the rubber for a textile roller provided by the present disclosure, the NBR is carboxylated nitrile rubber.

In the rubber for a textile roller provided by the present disclosure, the conductive powder is conductive carbon black or metal powder, the conductivity of which is less than 10 Ω·cm, and the particle size of which is less than 200 μm.

In the rubber for a textile roller provided by the present disclosure, the conductive bands are carbon nanotubes or nano silver wires, the outer diameter of which is 10-20 nm, and the length of which is 5-15 μm.

In the rubber for a textile roller provided by the present disclosure, the plasticizer comprises at least one of paraffin, dioctyl phthalate, Vaseline, and stearic acid.

In the rubber for a textile roller provided by the present disclosure, the anti-aging agent comprises at least one of diphenylamine 445, diphenylamine 4010NA, and quinoline RD.

In the rubber for a textile roller provided by the present disclosure, the vulcanizing agent is a peroxide vulcanizing agent.

The present disclosure also provides a preparation method of the rubber for a textile roller, comprising the following steps:

S100 plasticating: weigh NBR, and plasticate for twice, with each for 30-40 min, control the plastication temperature at 35-50° C.; after the first plastication, sit for 3-4 hours before proceeding to the second plastication; after the second plastication, sit for 10-15 hours, and obtain plasticated material.

S200 pre-mixing: add conductive bands into a small amount of liquid NBR in proportion, pre-mix, and obtain pre-mixed material.

S300 mixing: add plasticizer into the plasticated material to mix; during the mixing process, successively add conductive powder and the pre-mixed material in proportion; afterwards, add anti-aging agent and zinc oxide and mix well; lastly, add vulcanizing agent and mix for 3-4 min before unloading; control the mixing temperature at 35-40° C.

S400 vulcanizing: the vulcanizing temperature is 150-160° C., and the vulcanizing time is 15-40 min.

In the preparation method of the rubber for a textile roller provided in the present disclosure, the mass ratio of each composition is as follows: NBR 100, conductive powder 10-40, conductive bands 0.5-8, plasticizer 6-15, anti-aging agent 1-2, vulcanizing agent 2.5-4.5, and zinc oxide 3-5.

The present disclosure also provides a way of using the rubber for a textile roller, using the rubber for a textile roller mentioned above or prepared by the aforementioned method as a main material for a roller, or using as a coating for the outer surface of a roller.

Beneficial Technical Effect

The present disclosure has the following beneficial technical effects: the rubber for a textile roller of the present disclosure has high conductivity, can timely export static electricity, and has good mechanical performance suitable for a textile roller, applicable in components of a spinning frame, a roving frame, a drawing frame and other textile machines.

BRIEF DESCRIPTION OF THE DRAWINGS

To more clearly illustrate the embodiments of the present disclosure or the technical solutions of the prior art, a brief introduction for the figures required to describe the embodiments or the prior arts will follow, and apparently, the figures described below are merely some embodiments of the present disclosure; to a person having ordinary skill in the art, other figures can be obtained based on these figures without the need of creative work.

DETAILED DESCRIPTION OF THE INVENTION

Figure 1:
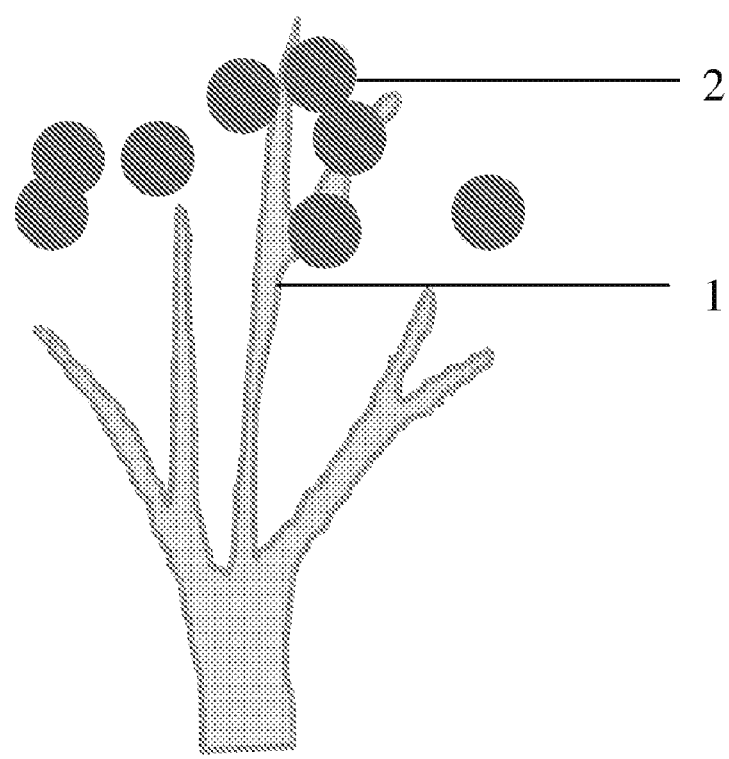
FIG. 1 is a structural schematic of conductive materials in the rubber for a textile roller.

A clear and complete description, in combination with the embodiments, for the technical solutions provided in these embodiments of the present disclosure will follow.

The rubber for a textile roller of the present disclosure, with NBR as the main material, and added with conductive powder and conductive bands, which form a net-node structure in NBR via a pre-mixing process flow. The net-node structure comprises a conductive net and conductive nodes, wherein the conductive bands form conductive bands, and the conductive powder form the conductive nodes. The rubber for a textile roller comprises the compositions with mass ratios as follows: NBR 100, conductive powder 10-40, conductive bands 0.5-8, plasticizer 6-15, anti-aging agent 1-2, vulcanizing agent 2.5-4.5, and zinc oxide 3-5. In the rubber for the finished textile roller, the conductive powder and the conductive bands form an "apple-tree structure", wherein the electric conductors formed by the conductive powder and the conductive paths formed by the conductive bands connect to each other. When the ratio of the conductive powder added to the rubber reach a certain value, and there is no significant increase in the conductivity with further addition of conductive powder, add conductive bands, and a small amount of the conductive bands can keep drastically increasing the conductivity of the conductive rubber, and significantly increase the wear resistance and resilience.

Preferably, the NBR used in the present disclosure is carboxylated nitrile rubber. The conductive powder used is conductive carbon black or metal powder, the conductivity of which is less than 10 Ω·cm, and the particle size of which is less than 200 μm. Conductive carbon black is the most commonly used conductive phase for conductive rubbers, has a low cost, and exhibits significant enhancement to rubbers. Conductive carbon black can be replaced by metal powder.

Preferably, the conductive bands used in the present disclosure are carbon nanotubes or nano silver wires, the outer diameter of which is 10-20 nm, and the length of which is 5-15 μm. Carbon nanotubes were discovered in 1990s, and is one of the most promising new nanomaterials at the beginning of the industrialization in this century; carbon nanotubes have very good conductivity and mechanical properties; if added into rubbers the carbon nanotubes can not only increase the conductivity of the rubbers, but also increase the resilience and stability of the rubbers. Carbon nanotubes can be replaced by nano silver wires.

During the rubber mixing process, conductive carbon black is added before carbon nanotubes. Carbon nanotubes are pre-mixed with liquid NBR before being added into the mixing process, so as to facilitate the dispersion of the carbon nanotubes inside NBR.

Preferably, the plasticizer used in the present disclosure comprises at least one of paraffin, dioctyl phthalate, Vaseline, and stearic acid. The anti-aging agent comprises at least one of diphenylamine 445, diphenylamine 4010NA, and quinoline RD. The vulcanizing agent is a peroxide vulcanizing agent, e.g. dicumyl oxide (DCP).

FIG. 1 illustrates the structure of the conductive materials in the rubber for a textile roller of the present disclosure; as shown in FIG. 1, the rubber for a textile roller of the present disclosure, with NBR as the main material, and added with conductive powder and conductive bands, which form an "apple tree"-like net-node structure, via a mixing process, wherein the conductive path structures formed by the conductive bands constitute the branches 1 of the apple tree, and the node structures formed by the conductive powder constitute the apples 2 of the apple tree. Thus, the rubber for a textile roller has relatively high conductivity and high mechanical performance suitable for a textile roller. Conductive bands are but not limited to carbon nanotubes or nano silver wires. Conductive powder is but not limited to powder-like conductive material, such as conductive carbon black or metal powder. The order of adding the "branches 1" and "apples 2" should be "apples 2" first and then "branches 1".

Figure 2:
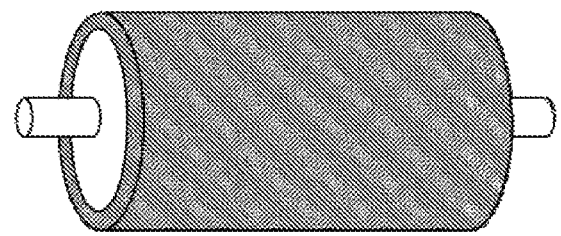
FIG. 2 is a structural schematic of the first embodiment of the application of the rubber for a textile roller.
Figure 3:
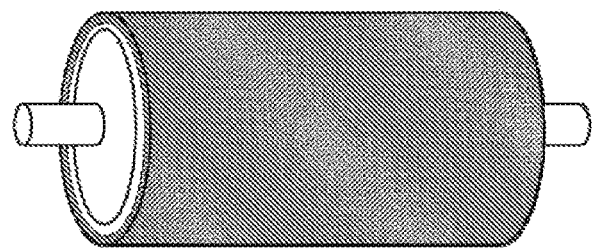
FIG. 3 is a structural schematic of the second embodiment of the application of the rubber for a textile roller.

The rubber for a textile roller of the present disclosure, can be used as the main material for a roller, as shown in FIG. 2, or used as a coating for the outer surface of a roller, as shown in FIG. 3. Specific color requirement of a roller can be fulfilled by adding colorless or light-colored filler.

Embodiment 1

The preparation method of the rubber for a textile roller of this embodiment, comprises the following steps:

1. Raw material preparation: weigh NBR 100, conductive carbon black 40, carbon nanotubes 8, plasticizer 15, anti-aging agent 2, vulcanizing agent 4.5, and zinc oxide 5. The plasticizer is paraffin, the anti-aging agent is diphenylamine 445, and the vulcanizing agent is DCP.

2. Plasticating: plasticate NBR for twice, with each for 30 min, control the plastication temperature at 35-40° C.; after the first plastication, sit for 3 hours before proceeding to the second plastication; after the second plastication, sit for 10 hours, and obtain plasticated material.

3. Pre-mixing: add carbon nanotubes into a small amount of liquid NBR in proportion, pre-mix, and obtain pre-mixed material.

4. Mixing: add plasticizer into the plasticated material to mix; during the mixing process, successively add conductive carbon black and the pre-mixed material in proportion; afterwards, add anti-aging agent and zinc oxide and mix well; lastly, add vulcanizing agent and mix for 4 min before unloading; control the mixing temperature at 35° C.

5. Vulcanizing: the vulcanizing temperature is 16° C. and the vulcanizing time is 15 min.

The conductive NBR prepared by the above-mentioned process has a tensile strength of >15 MPa, an elongation at break of >300%, and a volume resistivity of >$1.1 \times 10^{-4}$ Ω·cm.

Embodiment 2

The preparation method of the rubber for a textile roller of this embodiment, comprises the following steps:

1. Raw material preparation: weigh NBR 100, conductive carbon black 10, carbon nanotubes 0.5, plasticizer 6, anti-aging agent 1, vulcanizing agent 2.5, and zinc oxide 3. The plasticizer is 3 of dioctyl phthalate and 3 of Vaseline, the anti-aging agent is diphenylamine 4010NA, and the vulcanizing agent is DCP.

2. Plasticating: plasticate NBR for twice, with each for 40 min, control the plastication temperature at 40-50° C.; after the first plastication, sit for 4 hours before proceeding to the second plastication; after the second plastication, sit for 15 hours, and obtain plasticated material.

3. Pre-mixing: add carbon nanotubes into a small amount of liquid NBR in proportion, pre-mix, and obtain pre-mixed material.

4. Mixing: add plasticizer into the plasticated material to mix; during the mixing process, successively add conductive carbon black and the pre-mixed material in proportion; afterwards, add anti-aging agent and zinc oxide and mix well; lastly, add vulcanizing agent and mix for 3 min before unloading; control the mixing temperature at 40° C.

5. Vulcanizing: the vulcanizing temperature is 150° C., and the vulcanizing time is 40 min.

The conductive NBR prepared by the above-mentioned process has a tensile strength of >15 MPa, an elongation at break of >350%, and a volume resistivity of >1.4×10$^{-4}$ Ω·cm.

Embodiment 3

The preparation method of the rubber for a textile roller of this embodiment, comprises the following steps:

1. Raw material preparation: weigh NBR 100, conductive carbon black 20, carbon nanotubes 2, plasticizer 10, anti-aging agent 2, vulcanizing agent 3, and zinc oxide 3. The plasticizer is 5 of paraffin and 5 of dioctyl phthalate, the anti-aging agent is quinoline RD, and the vulcanizing agent is DCP.

2. Plasticating: plasticate NBR for twice, with each for 30 min, control the plastication temperature at 40-45° C.; after the first plastication, sit for 3 hours before proceeding to the second plastication; after the second plastication, sit for 10 hours, and obtain plasticated material.

3. Pre-mixing: add carbon nanotubes into a small amount of liquid NBR in proportion, pre-mix, and obtain pre-mixed material.

4. Mixing: add plasticizer into the plasticated material to mix; during the mixing process, successively add conductive carbon black and the pre-mixed material in proportion; afterwards, add anti-aging agent and zinc oxide and mix well; lastly, add vulcanizing agent and mix for 4 min before unloading; control the mixing temperature at 35° C.

5. Vulcanizing: the vulcanizing temperature is 160° C., and the vulcanizing time is 15 min.

The conductive NBR prepared by the above-mentioned process has a tensile strength of >15 MPa, an elongation at break of >300%, and a volume resistivity of >1.3×10$^{-4}$ Ω·cm.

Embodiment 4

The preparation method of the rubber for a textile roller of this embodiment, comprises the following steps:

1. Raw material preparation: weigh NBR 100, conductive carbon black 30, carbon nanotubes 3, plasticizer 12, anti-aging agent 1.5, vulcanizing agent 4, and zinc oxide 3-5. The plasticizer is 6 of paraffin and 6 of stearic acid, the anti-aging agent is diphenylamine 4010NA, and the vulcanizing agent is DCP.

2. Plasticating: plasticate NBR for twice, with each for 30 min, control the plastication temperature at 35-40° C.; after the first plastication, sit for 3 hours before proceeding to the second plastication; after the second plastication, sit for 10 hours, and obtain plasticated material.

3. Pre-mixing: add carbon nanotubes into a small amount of liquid NBR in proportion, pre-mix, and obtain pre-mixed material.

4. Mixing: add plasticizer into the plasticated material to mix; during the mixing process, successively add conductive carbon black and the pre-mixed material in proportion; afterwards, add anti-aging agent and zinc oxide and mix well; lastly, add vulcanizing agent and mix for 4 min before unloading; control the mixing temperature at 35° C.

5. Vulcanizing: the vulcanizing temperature is 160° C., and the vulcanizing time is 15 min.

The conductive NBR prepared by the above-mentioned process has a tensile strength of >15 MPa, an elongation at break of >300%, and a volume resistivity of >1.2×10$^{-4}$ Ω·cm.

In the above-mentioned embodiments, the conductive carbon black can be replaced by metal powder, and the carbon nanotube can be replaced by nano silver wire, and the obtained rubbers for a textile roller have similar properties.

It should be understood that, the following technical solutions are merely used for illustrating the present disclosure rather than limiting the scope of the present disclosure. It should also be understood that, after reading the content of the present disclosure, the skilled person in the art can make various changes or modification to the present disclosure, and these equivalents shall also fall within the scope of the claims companied with the present disclosure.

The invention claimed is:

1. A rubber for a textile roller comprising: nitrile butadiene rubber (NBR) as a main material, a conductive powder, and conductive bands wherein said conductive powder and said conductive bands form a net-node structure in said NBR, wherein said net-node structure comprises a conductive net and conductive nodes, wherein said conductive bands form said conductive net and said conductive powder forms said conductive nodes; the rubber for the textile roller comprises compositions with following mass ratio: NBR 100, said conductive powder 10-40, said conductive bands 0.5-8, a plasticizer 6-15, an anti-aging agent 1-2, a vulcanizing agent 2.5-4.5, and zinc oxide 3-5.

2. The rubber for a textile roller according to claim 1, wherein said NBR is carboxylated nitrile rubber; said conductive powder is conductive carbon black or metal powder, wherein the conductive powder has a volume resistivity of less than 10 Ω·cm and a particle size of less than 200 μm; and said conductive bands are carbon nanotubes or nano silver wires, wherein the conductive bands have an outer diameter of 10-20 nm and a length of 5-15 μm.

3. The rubber for a textile roller according to claim 2, wherein said plasticizer comprises at least one of paraffin, dioctyl phthalate, petroleum jelly, and stearic acid.

4. The rubber for a textile roller according to claim 2, wherein said anti-aging agent comprises at least one of bis[4-(2-phenyl-2-propyl)phenyl]amine, 4-(isopropylamino)diphenylamine, and poly(1,2-dihydro-2,2,4-trimethyl quinoline.

5. The rubber for a textile roller according to claim 2, wherein said vulcanizing agent is a peroxide vulcanizing agent.

* * * * *